(12) United States Patent
Giesker et al.

(10) Patent No.: US 12,359,017 B2
(45) Date of Patent: Jul. 15, 2025

(54) METHOD FOR PRODUCING A RIGID POLYURETHANE FOAM

(71) Applicant: BASF SE, Ludwigshafen (DE)

(72) Inventors: Christiane Giesker, Osnabrueck (DE); Mark Elbing, Bremen (DE); Joerg Krogmann, Lohne (DE); Patrick Lax, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/736,994

(22) PCT Filed: Jun. 16, 2016

(86) PCT No.: PCT/EP2016/063853
§ 371 (c)(1),
(2) Date: Dec. 15, 2017

(87) PCT Pub. No.: WO2016/202912
PCT Pub. Date: Dec. 22, 2016

(65) Prior Publication Data
US 2018/0186924 A1    Jul. 5, 2018

(30) Foreign Application Priority Data

Jun. 18, 2015  (EP) .................................... 15172672

(51) Int. Cl.
*C08G 18/09*    (2006.01)
*C08G 18/32*    (2006.01)
*C08G 18/36*    (2006.01)
*C08G 18/40*    (2006.01)
*C08G 18/42*    (2006.01)
(Continued)

(52) U.S. Cl.
CPC ....... *C08G 18/7664* (2013.01); *C08G 18/092* (2013.01); *C08G 18/3206* (2013.01); *C08G 18/36* (2013.01); *C08G 18/4018* (2013.01); *C08G 18/4288* (2013.01); *C08G 18/4291* (2013.01); *C08G 18/4816* (2013.01); *C08G 18/4845* (2013.01); *C08G 18/6696* (2013.01); *C08J 9/0038* (2013.01); *C08J 9/08* (2013.01); *C08J 9/125* (2013.01); *C08J 9/147* (2013.01); *C08G 2110/0025* (2021.01); *C08G 2110/005* (2021.01); *C08G 2110/0083* (2021.01); *C08G 2330/00* (2013.01); *C08J 9/0023* (2013.01); *C08J 9/141* (2013.01); *C08J 2201/022* (2013.01); *C08J 2203/02* (2013.01); *C08J 2203/10* (2013.01); *C08J 2203/14* (2013.01); *C08J 2203/142* (2013.01); *C08J 2203/204* (2013.01); *C08J 2205/10* (2013.01); *C08J 2375/04* (2013.01)

(58) Field of Classification Search
CPC ............. C08G 18/36; C08G 2101/0025; C08J 2205/10
See application file for complete search history.

(56) References Cited

U.S. PATENT DOCUMENTS 3,781,235 A    12/1973  Trott et al.
B314,049 I5    1/1975   Traubel et al.
(Continued)

FOREIGN PATENT DOCUMENTS

AU    1415695 A    8/1995
CA     956762 A   10/1974
(Continued)

OTHER PUBLICATIONS

English-language abstract of JP 20050264082 to Ishikawa obtained from European Patent Office (Year: 2019).*
Machine translation of JP 20050264082 to Ishikawa obtained from European Patent Office (Year: 2019).*
International Preliminary Report on Patentability issued Dec. 21, 2017 in PCT/EP2016/063853 (English translation only).
International Search Report issued Aug. 16, 2016 in PCT/EP2016/063853, 4 pages.
(Continued)

*Primary Examiner* — Melissa A Rioja
(74) *Attorney, Agent, or Firm* — Grüneberg and Myers PLLC

(57) ABSTRACT

The present invention relates to a process for the production of a rigid polyurethane foam or rigid polyisocyanurate foam, comprising the reaction of at least one polyisocyanate and of a polyol composition (PZ), where the polyol composition (PZ) comprises at least one compound having at least two hydrogen atoms reactive toward isocyanate groups and at least one compound (I) selected from the group consisting of dicarboxylic diesters of dicarboxylic acids having from 2 to 18 C atoms and tricarboxylic triesters of tricarboxylic acids having from 3 to 18 C atoms, where at least one blowing agent is used during the reaction. The present invention further relates to rigid polyurethane foams or rigid polyisocyanurate foams obtainable or obtained by such a process, and also to a polyol composition (PZ) at least comprising one compound having at least two hydrogen atoms reactive toward isocyanate groups and at least one compound (I) selected from the group consisting of dicarboxylic diesters of dicarboxylic acids having from 2 to 18 C atoms and tricarboxylic triesters of tricarboxylic acids having from 3 to 18 C atoms. The present invention also relates to the use of such a polyol composition (PZ) for the production of rigid polyurethane foams or rigid polyisocyanurate foams, and also to the use of a rigid polyurethane foam or rigid polyisocyanurate foam of the invention as, or for the production of, insulation materials, preferably insulation sheets, sandwich elements, hot-water tanks, boilers, coolers, insulation foams, refrigerators or freezers.

17 Claims, No Drawings

(51) Int. Cl.
*C08G 18/48* (2006.01)
*C08G 18/66* (2006.01)
*C08G 18/76* (2006.01)
*C08J 9/00* (2006.01)
*C08J 9/08* (2006.01)
*C08J 9/12* (2006.01)
*C08J 9/14* (2006.01)
*C08K 5/11* (2006.01)

(56) References Cited

U.S. PATENT DOCUMENTS

| | | | |
|---|---|---|---|
| 4,273,179 A | | 6/1981 | Gardikes |
| 5,143,942 A * | | 9/1992 | Brown ............... C08G 18/6688 |
| | | | 521/110 |
| 5,633,289 A * | | 5/1997 | Nakamura ................ C08J 9/14 |
| | | | 264/51 |
| 5,684,116 A | | 11/1997 | Martl et al. |
| 5,741,827 A * | | 4/1998 | Chakrabarti ....... C08G 18/3851 |
| | | | 521/114 |
| 5,885,479 A * | | 3/1999 | Chakrabarti ....... C08G 18/3851 |
| | | | 252/182.24 |
| 6,136,876 A * | | 10/2000 | Meier ................... C08G 18/089 |
| | | | 521/112 |
| 6,414,045 B1 | | 7/2002 | Heimpel et al. |
| 9,777,104 B2 * | | 10/2017 | Boehnke ............ C08G 18/3206 |
| 2006/0142407 A1 * | | 6/2006 | Hollmann .......... C08G 18/1825 |
| | | | 521/172 |
| 2007/0276055 A1 * | | 11/2007 | Sjerps ................ C08G 18/4829 |
| | | | 521/85 |
| 2008/0051481 A1 | | 2/2008 | Krupa et al. |
| 2008/0064778 A1 | | 3/2008 | Hasegawa et al. |
| 2013/0172435 A1 * | | 7/2013 | Otero Martinez . C08G 18/3206 |
| | | | 521/107 |
| 2014/0288204 A1 * | | 9/2014 | Bohnke .............. C08G 18/7671 |
| | | | 521/160 |
| 2014/0364528 A1 * | | 12/2014 | Rexrode ................ C08G 18/12 |
| | | | 521/177 |
| 2016/0369035 A1 * | | 12/2016 | Burdeniuc .......... C08G 18/4829 |
| 2021/0024795 A1 * | | 1/2021 | Schmatloch ........ C08G 18/6229 |

FOREIGN PATENT DOCUMENTS

| | | | |
|---|---|---|---|
| CA | 2164 805 | A1 | 6/1996 |
| CA | 2 309 488 | A1 | 12/2000 |
| DE | 2034 538 | A1 | 2/1972 |
| DE | 199 26 312 | A1 | 12/2000 |
| EP | 0 716 112 | A2 | 6/1996 |
| EP | 1 806 374 | A1 | 7/2007 |
| JP | 2004-83847 | A | 3/2004 |
| JP | 2005-264082 | A | 9/2005 |
| WO | WO 95/18839 | A1 | 7/1995 |
| WO | WO 2004/009667 | A1 | 1/2004 |
| WO | WO 2011/039082 | A1 | 4/2011 |

OTHER PUBLICATIONS

Anonymous: "Kältemittel—Wikipedia", Apr. 14, 2017 (Apr. 14, 2017) XP055369065, 23 pages, found in Internet: URL:https://de.wikipedia.org/wiki/Kältemittel.

Anonymous: "List of refrigerants—Wikipedia", May 23, 2017 (May 23, 2017), XP055399550, 11 pages, found in Internet: URL:https://en.wikipedia.org/wiki/List_of_refrigerants.

* cited by examiner

METHOD FOR PRODUCING A RIGID POLYURETHANE FOAM

The present invention relates to a process for the production of a rigid polyurethane foam or rigid polyisocyanurate foam, comprising the reaction of at least one polyisocyanate and of a polyol composition (PZ), where the polyol composition (PZ) comprises at least one compound having at least two hydrogen atoms reactive toward isocyanate groups and at least one compound (I) selected from the group consisting of dicarboxylic diesters of dicarboxylic acids having from 2 to 18 C atoms and tricarboxylic triesters of tricarboxylic acids having from 3 to 18 C atoms, where at least one blowing agent is used during the reaction. The present invention further relates to rigid polyurethane foams or rigid polyisocyanurate foams obtainable or obtained by such a process, and also to a polyol composition (PZ) at least comprising one compound having at least two hydrogen atoms reactive toward isocyanate groups and at least one compound (I) selected from the group consisting of dicarboxylic diesters of dicarboxylic acids having from 2 to 18 C atoms and tricarboxylic triesters of tricarboxylic acids having from 3 to 18 C atoms. The present invention also relates to the use of such a polyol composition (PZ) for the production of rigid polyurethane foams or rigid polyisocyanurate foams.

Rigid polyurethane foams and rigid polyisocyanurate foams have been known for a long time and are used mainly for insulation in respect of high and low temperatures, e.g. in refrigerators, in hot-water tanks, in district-heating pipes or in the construction industry, for example in sandwich elements.

They are mostly produced via reaction of polyisocyanates with compounds having at least two hydrogen atoms reactive toward isocyanate groups in the presence of catalysts, blowing agents, and also additives.

Significant properties required from rigid polyurethane foams are low thermal conductivity, good flowability, adequate adhesion of the foam to the outer layers and good mechanical properties.

In particular when rigid polyurethane foams are produced with use of water as blowing agent, the foams often exhibit inadequate adhesion. US 5798533 describes the use of specific catalysts to improve the adhesion of exclusively water-blown rigid foams in order to improve adhesion to polystyrene or ABS for use in refrigerators. However, this can adversely affect the flowability and mechanical properties of the foams. WO 2004/009667 describes the use of graft polyols in exclusively water-blown rigid foam systems in order to reduce embrittlement of the foam, and also to improve adhesion to other substrates. However, graft polyols are expensive and are often incompatible with other constituents of the polyurethane systems. EP 1806374 describes rigid polyurethane foams for refrigerators with improved adhesion via use of alkoxylated monoamines, for example aniline. However, these compounds can adversely affect the processing properties of the foams. Rigid polyurethane foams produced entirely or mainly with use of water as blowing agent exhibit improved adhesion if the foam system comprises castor oil and a compound selected from the group comprising alkylene carbonates, carboxamides and pyrrolidones.

US 2008051481 describes flame-retardant rigid polyurethane foams produced with use of halogenated, in particular brominated, polyols. Blowing agents used preferably comprise physical blowing agents, optionally with concomitant use of water as co-blowing agent. Use of adhesion promoters is described for improving the adhesion of these products. Use of propylene carbonate or castor oil, and also of a number of other substances, is proposed.

However, the halogenated flame retardants described in US 2008051481 are unsuitable for use in refrigerators.

WO 2011/039082 A1 discloses rigid polyurethane foams which are produced entirely or mainly with use of water as blowing agent and exhibit improved adhesion if the foam system comprises castor oil and a compound selected from the group comprising alkylene carbonates, carboxamides and pyrrolidones. Very good adhesion values are achieved in these systems. However, the formulations are unsuitable for prolonged storage because decomposition of the starting materials can occur, with the possibility of attendant gas evolution.

It was therefore an object of the present invention to provide rigid polyurethane foams and rigid polyisocyanurate foams which exhibit good adhesion values, and processes for production of these foams. Another object of the present invention was to provide rigid polyurethane foams and rigid polyisocyanurate foams which can be produced from phase-stable components, and processes for production of these foams. Another object of the present invention was to reduce the quantity of organic carbonates used in the polyol composition.

This object is achieved in the invention via a process for the production of a rigid polyurethane foam or rigid polyisocyanurate foam, comprising the reaction of
   a) at least one polyisocyanate and
   b) of a polyol composition (PZ),
where the polyol composition (PZ) comprises at least one compound having at least two hydrogen atoms reactive toward isocyanate groups and at least one compound (I) selected from the group consisting of dicarboxylic diesters of dicarboxylic acids having from 2 to 18 C atoms and tricarboxylic triesters of tricarboxylic acids having from 3 to 18 C atoms, where at least one blowing agent is used during the reaction.

A polyol composition (PZ) is used for the purposes of the present invention. The polyol composition (PZ) comprises at least one compound having at least two hydrogen atoms reactive toward isocyanate groups and at least one compound (I) selected from the group consisting of dicarboxylic diesters of dicarboxylic acids having from 2 to 18 C atoms and tricarboxylic triesters of tricarboxylic acids having from 3 to 18 C atoms. The polyol composition here can comprise other components, for example can also comprise a chemical blowing agent. A physical blowing agent used in the process is usually not regarded as constituent of the polyol composition.

At least one blowing agent is used in the process of the invention. The blowing agent here can be added to the at least one polyisocyanate or to the polyol composition, or can be added separately. It is preferable that the at least one blowing agent is added to the polyol composition for the purposes of the present invention.

Accordingly, another embodiment of the present invention also provides a process for the production of a rigid polyurethane foam or rigid polyisocyanurate foam comprising the reaction of at least one polyisocyanate and of a polyol composition (PZ), where the polyol composition (PZ) comprises the at least one blowing agent.

It is also possible in the invention that by way of example a blowing agent is added to the polyol composition (PZ) and another blowing agent is added separately.

The process of the invention comprises the reaction of at least one polyisocyanate and of a polyol composition (PZ).

The polyol composition (PZ) comprises at least one compound having at least two hydrogen atoms reactive toward isocyanate groups and at least one compound (I) selected from the group consisting of dicarboxylic diesters of dicarboxylic acids having from 2 to 18 C atoms and tricarboxylic triesters of tricarboxylic acids having from 3 to 18 C atoms.

Surprisingly, it has been found that the process of the invention gives rigid polyurethane foams and rigid polyisocyanurate foams which exhibit good adhesion values while at the same time the components used exhibit good shelf life. The process of the invention moreover permits reduction of the quantity of organic carbonates used. The polyol composition (PZ) in the invention comprises a quantity of organic carbonates in the range from 0 to 1% by weight, for example a quantity in the range from 0.01 to 0.75% by weight, more preferably a quantity in the range from 0.01 to 0.5% by weight. It is also possible in the invention that the polyol composition is free from organic carbonates, for example free from alkylene carbonates.

The polyol composition (PZ) comprises at least one compound having at least two hydrogen atoms reactive toward isocyanate groups and at least one compound (I) as defined above. The compound (I) is preferably selected from the group consisting of dicarboxylic diesters of the general formula:

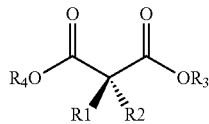

where R1 and R2 are mutually independently H or an alkyl moiety having from 1 to 6 C atoms; and R3 and R4 are mutually independently an alkyl moiety having from 1 to 18 C atoms.

It is further preferable that the moieties R1 and R2 are H and that the moieties R3 and R4 are mutually independently an alkyl moiety having from 1 to 6 C atoms, more preferably an alkyl moiety having from 1 to 2 C atoms. It is particularly preferable that the compound (I) is selected from malonic diesters. Compounds that have proven to be particularly suitable for the purposes of the present invention are malonic diesters selected from the group consisting of dimethyl malonate, diethyl malonate, dipropyl malonate, dibutyl malonate, dipentyl malonate, dihexyl malonate, methyl ethyl malonate, methyl propyl malonate, methyl butyl malonate, methyl pentyl malonate, methyl hexyl malonate, ethyl propyl malonate, ethyl butyl malonate, ethyl pentyl malonate, ethyl hexyl malonate, propyl butyl malonate, propyl pentyl malonate, propyl hexyl malonate, butyl pentyl malonate, butyl hexyl malonate and pentyl hexyl malonate, with particular preference selected from the group consisting of dimethyl malonate, diethyl malonate, dipropyl malonate, dibutyl malonate, dipentyl malonate, dihexyl malonate and methyl ethyl malonate.

Accordingly, another embodiment of the present invention also provides a process for the production of a rigid polyurethane foam or rigid polyisocyanurate foam comprising the reaction of at least one polyisocyanate and of a polyol composition (PZ), where the compound (I) is selected from the group consisting of dicarboxylic diesters of the general formula:

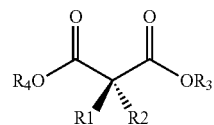

where R1 and R2 are mutually independently H or an alkyl moiety having from 1 to 6 C atoms; and R3 and R4 are mutually independently an alkyl moiety having from 1 to 18 C atoms.

Accordingly, another embodiment of the present invention also provides a process for the production of a rigid polyurethane foam or rigid polyisocyanurate foam comprising the reaction of at least one polyisocyanate and of a polyol composition (PZ), where the compound (I) is selected from the group consisting of malonic diesters.

Accordingly, another embodiment of the present invention also provides a process for the production of a rigid polyurethane foam or rigid polyisocyanurate foam comprising the reaction of at least one polyisocyanate and of a polyol composition (PZ), where the compound (I) is selected from the group consisting of dimethyl malonate, diethyl malonate, dipropyl malonate, dibutyl malonate, dipentyl malonate, dihexyl malonate, methyl ethyl malonate, methyl propyl malonate, methyl butyl malonate, methyl pentyl malonate, methyl hexyl malonate, ethyl propyl malonate, ethyl butyl malonate, ethyl pentyl malonate, ethyl hexyl malonate, propyl butyl malonate, propyl pentyl malonate, propyl hexyl malonate, butyl pentyl malonate, butyl hexyl malonate and pentyl hexyl malonate.

It is also possible here for the purposes of the present invention to use mixtures of various esters. Accordingly, the polyol composition (PZ) can also comprise two or more compounds selected from the group consisting of dicarboxylic diesters of dicarboxylic acids having from 2 to 18 C atoms and tricarboxylic triesters of tricarboxylic acids having from 3 to 18 C atoms.

A suitable quantity of the compound (I) can be used, where the quantity of the compound (I) used is usually in the range from 0.5 to 10% by weight, based on the weight of the polyol composition (PZ), preferably in the range from 1.0 to 7.5% by weight, based on the weight of the polyol composition (PZ), more preferably in the range from 1.5 to 5.0% by weight, based on the weight of the polyol composition (PZ).

Accordingly, another embodiment of the present invention also provides a process for the production of a rigid polyurethane foam or rigid polyisocyanurate foam comprising the reaction of at least one polyisocyanate and of a polyol composition (PZ), where the quantity of the compound (I) used is in the range from 0.5 to 10% by weight, based on the weight of the polyol composition (PZ).

The polyol composition (PZ) can also comprise other compounds. Surprisingly, it has been found that good properties are obtained when the polyol composition (PZ) comprises, alongside the compound (I), a fatty acid or an ester of a fatty acid, for example castor oil. The polyol composition here can also comprise mixtures of various fatty acids or fatty acid esters. Compounds suitable for the purposes of the present invention are in particular aliphatic fatty acids having more than 10 C atoms, preferably more than 12 C atoms, and esters of these fatty acids, for example palmitic acid, stearic acid, oleic acid, dodecanoic acid, tetradecanoic acid, erucic acid, linoleic acid, linolenic acid, arachidonic acid or ricinoleic acid.

Accordingly, another embodiment of the present invention also provides a process for the production of a rigid polyurethane foam or rigid polyisocyanurate foam comprising the reaction of at least one polyisocyanate and of a polyol composition (PZ), where the polyol composition (PZ) comprises at least one fatty acid or one fatty acid ester. A preferred embodiment of the present invention provides a process for the production of a rigid polyurethane foam or rigid polyisocyanurate foam comprising the reaction of at least one polyisocyanate and of a polyol composition (PZ), where the polyol composition (PZ) comprises castor oil.

The quantity of the fatty acid or fatty acid ester used, in particular of the castor oil used, can also vary widely. The quantity of fatty acid or fatty acid ester used, in particular the quantity of the castor oil used, is usually in the range from 1 to 20% by weight, based on the weight of the polyol composition (PZ).

The castor oil can also have been chemically modified, in particular via adduct-formation with alkylene oxides. However, it is preferable to use unmodified castor oil.

For the purposes of the present invention it is preferable to use at least one blowing agent. Suitable blowing agents are known to the person skilled in the art.

For the purposes of the present invention, it is preferable that blowing agent used comprises water, which reacts with isocyanate groups with elimination of carbon dioxide. The water here can be used as sole blowing agent. It is also possible to use the water in a mixture with other, in particular physical, blowing agents. It is also possible in the invention that other chemical blowing agents are used, for example formic acid.

In combination with water it is in particular possible to use physical blowing agents. These are compounds that are inert to the starting components and that are mostly liquid at room temperature and evaporate under the conditions of the urethane reaction. The boiling point of these compounds is preferably below 50° C. Among the physical blowing agents are also compounds that are gaseous at room temperature and are introduced into, or dissolved in, the starting components under pressure, examples being carbon dioxide, low-boiling-point alkanes and fluoroalkanes, and also halogenated alkenes. The blowing agents are mostly selected from the group comprising alkanes and/or cycloalkanes having at least 4 carbon atoms, dialkyl ethers, esters, ketones, acetals, fluoroalkanes having from 1 to 8 carbon atoms, and tetraalkylsilanes having from 1 to 3 carbon atoms in the alkyl chain, in particular tetramethylsilane. The following may be mentioned by way of example: propane, n-butane, iso- and cyclobutane, n-, iso- and cyclopentane, cyclohexane, dimethyl ether, methyl ethyl ether, methyl butyl ether, methyl formate, acetone, and also fluoroalkanes, for example trifluoromethane, difluoromethane, 1,3,3,3-tetrafluoropropene, 1,1,1,3,3-pentafluorobutane, 1,1,1,3,3-pentafluoropropane, 1,1,1,2-tetrafluoroethane, 1,1,1,2,3-pentafluoropropene, 1,1,1,4,4,4-hexafluorobutene, 1-chloro-3,3,3-trifluoropropene, difluoroethane and heptafluoropropane. The physical blowing agents mentioned can be used alone or in any desired combinations with one another. For the purposes of the present invention it is possible to use cis- or trans-isomers, or else a mixture of various isomers.

Insofar as water is used as sole blowing agent, the quantity usually used thereof is in the range from 1 to 10% by weight, based on the weight of the polyol composition (PZ), for example a quantity in the range from 2.5 to 7.5% by weight, more preferably a quantity in the range from 3.5 to 6.5% by weight, based in each case on the weight of the polyol composition (PZ).

Accordingly, another embodiment of the present invention also provides a process for the production of a rigid polyurethane foam or rigid polyisocyanurate foam comprising the reaction of at least one polyisocyanate and of a polyol composition (PZ), where blowing agent used comprises a quantity of water in the range from 0.1 to 10% by weight, based on the weight of the polyol composition (PZ).

Insofar as water is used in combination with another blowing agent, the quantity of water used is adjusted appropriately. If water is used in combination with a chemical or physical blowing agent, it is usual to use a quantity of water in the range from 0.1 to 5.0% by weight, more preferably a quantity in the range from 0.3 to 4.0% by weight, based in each case on the weight of the polyol composition (PZ).

The quantity of the physical blowing agent used can vary widely.

At least one polyisocyanate is used in the invention. In principle it is possible to use any of suitable polyisocyanates. In particular, organic polyisocyanates used can comprise any of the known organic di- and polyisocyanates, preferably aromatic polyfunctional isocyanates.

Specific compounds that may be mentioned are: tolylene 2,4- and 2,6-diisocyanate (TDI) and the corresponding isomer mixtures, diphenylmethane 4,4'-, 2,4''- and 2,2'-diisocyanate (MDI) and the corresponding isomer mixtures, mixtures of diphenylmethane 4,4'- and 2,4'-diisocyanates, polyphenyl polymethylene polyisocyanates, mixtures of diphenylmethane 4,4'-, 2,4'- and 2,2'-diisocyanates and of polyphenyl polymethylene polyisocyanates (crude MDI) and mixtures of crude MDI and of tolylene diisocyanates. The organic di- and polyisocyanates can be used individually or in the form of mixtures. Use is also often made of what are known as modified polyfunctional isocyanates, i.e. products obtained via chemical reaction of organic di- and/or polyisocyanates. Materials that may be mentioned by way of example are di- and/or polyisocyanates comprising the following groups: uretdione, carbamate, isocyanurate, carbodiimide, allophanate and/or urethane. The modified polyisocyanates can optionally be mixed with one another or with unmodified organic polyisocyanates, for example diphenylmethane 2,4'- or 4,4'-diisocyanate, crude MDI, and tolylene 2,4- and/or 2,6-diisocyanate.

It is also possible to use, alongside the above, reaction products of polyfunctional isocyanates with polyhydric polyols, and also mixtures of these with other di- and polyisocyanates.

A material which has proven particularly successful as organic polyisocyanate is crude MDI, in particular with from 29 to 33% by weight NCO content and with viscosity in the range from 150 to 1000 mPas at 25° C.

The polyol composition (PZ) comprises at least one compound having at least two hydrogen atoms reactive toward isocyanate groups. Suitable compounds are by way of example those having OH or NH groups.

Compounds having at least two hydrogen atoms reactive toward isocyanate groups comprise those which comprise at least two reactive groups which are preferably OH groups, in particular polyether alcohols and/or polyester alcohols having OH numbers in the range from 25 to 800 mg KOH/g.

The polyester alcohols used are mostly produced via condensation of polyhydric alcohols, preferably diols, having from 2 to 12 carbon atoms, preferably from 2 to 6 carbon atoms, with polybasic carboxylic acids having from 2 to 12 carbon atoms, for example succinic acid, glutaric acid, adipic acid, suberic acid, azelaic acid, sebacic acid, decanedicarboxylic acid, maleic acid, fumaric acid and preferably phthalic acid, isophthalic acid, terephthalic acid and the isomeric naphthalenedicarboxylic acids.

The functionality of the polyester alcohols used is usually in the range from 1.5 to 4.

In particular, polyether alcohols are used which are produced by known processes, for example by anionic polymerization of alkylene oxides on H-functional starter substances in the presence of catalysts, preferably alkali metal hydroxides or double-metal cyanide catalysts (DMC catalysts).

Alkylene oxides used mostly comprise ethylene oxide or propylene oxide, or else tetrahydrofuran, various butylene oxides, styrene oxide, or preferably exclusively propylene 1,2-oxide. The alkylene oxides can be used individually, in alternating succession, or in the form of mixture.

Starter substances that can be used in particular comprise compounds having, in the molecule, at least 2 hydroxy groups, preferably from 2 to 8 hydroxy groups, or at least one primary amino group. Starter substances used having, in the molecule, at least 2 hydroxy groups, preferably from 2 to 8 hydroxy groups, preferably comprise trimethylolpropane, glycerol, pentaerythritol, sugar compounds, for example glucose, sorbitol, mannitol and sucrose, polyhydric phenols, resols, e.g. oligomeric condensates of phenol and formaldehyde, and Mannich condensates derived from phenols and formaldehyde and from dialkanolamines, and also melamine.

Starter substances used having, in the molecule, at least one primary amino group preferably comprise aromatic di- and/or polyamines, for example phenylenediamines, and 4,4'-, 2,4'- and 2,2'-diaminodiphenylmethane, and also aliphatic di- and polyamines, for example ethylenediamine. Other suitable compounds are ethanolamine and toluenediamines.

The functionality of the polyether alcohols is preferably from 2 to 8, and their hydroxy numbers are preferably from 25 mg KOH/g to 800 mg KOH/g and in particular from 150 mg KOH/g to 570 mg KOH/g.

It is also possible in the invention that the polyol composition (PZ) comprises two or more compounds having at least two hydrogen atoms reactive toward isocyanate groups.

In a preferred embodiment of the process of the invention, the polyol composition (PZ) comprises at least one polyether alcohol (P1) with hydroxy number in the range from 350 to 600 and with functionality in the range from 3.5 to 5.5.

The polyether alcohol (P1) is preferably produced via an addition reaction of ethylene oxide and/or propylene oxide, preferably propylene oxide, onto H-functional starter substances. Starter substances preferably used comprise the above-listed sugars, in particular sucrose or sorbitol. The sugars are usually reacted in the presence of what are known as co-starters, mostly room-temperature-liquid di- or trihydric alcohols, for example glycerol, trimethylolpropane, ethylene glycol, propylene glycol, or water, with the alkylene oxides. Catalysts usually used comprise basic compounds, preferably potassium hydroxide, or amines.

The quantity preferably used of the polyether alcohol (P1) is from 35 to 55% by weight, based on the weight of component b). Within this range particularly good adhesion is achieved and moreover with reduced brittleness of the foam.

In another preferred embodiment, component b) comprises at least one polyether alcohol (P2). This is a di- to trihydric polyether alcohol with hydroxy number in the range from 150 to 450 mg KOH/g. Compounds used are preferably glycerol and/or trimethylolpropane as starter substances and ethylene oxide and/or propylene oxide, in particular propylene oxide, as alkylene oxide. The quantity of component (P2) used is preferably from 18 to 35% by weight, based on the weight of component b). In a preferred variant, the polyether alcohol (P2) is a trihydric polyether alcohol with hydroxy number in the range from 150 to 420 mg KOH/g.

In a particularly preferred embodiment of the process of the invention, component (P2) used comprises at least one polyether alcohol (P2a) and at least one polyether alcohol (P2b).

Polyether alcohol (P2a) is a trihydric, preferably trimethylolpropane-started polyether alcohol with hydroxy number in the range from 150 to 200 mg KOH/g.

Polyether alcohol (P2b) is a trihydric, preferably glycerol-started polyether alcohol with hydroxy number in the range from 350 to 420 mg KOH/g.

The phase stability of the polyol component can be improved by using the polyether alcohols (P2).

Among the compounds having at least two hydrogen atoms reactive toward isocyanate are also the optionally concomitantly used chain extenders and crosslinking agents. Addition of difunctional chain extenders, crosslinking agents of functionality at least three, or else optionally a mixture thereof, can be advantageous for modification of mechanical properties. Chain extenders and/or crosslinking agents used preferably comprise alkanolamines and in particular diols and/or triols with molecular weights below 400, preferably from 60 to 300.

The quantity of chain extenders used, crosslinking agents or a mixture thereof is advantageously from 1 to 20% by weight, preferably from 2 to 5% by weight, based on the polyol component.

The rigid foams are usually produced in the presence of blowing agents, catalysts and cell stabilizers, and also if necessary of other auxiliaries and/or additives, for example flame retardants.

Catalysts used in particular comprise compounds which greatly accelerate the reaction of the isocyanate groups with the groups reactive toward isocyanate groups. Such catalysts are by way of example basic amines, for example secondary aliphatic amines, imidazoles, amidines, alkanolamines, Lewis acids or organometallic compounds, in particular those based on tin or bismuth. It is also possible to use catalyst systems consisting of a mixture of various catalysts.

Isocyanurate catalysts used usually comprise metal carboxylates, in particular potassium formate, potassium octanoates or potassium acetate or solutions of these. The catalyst can, as necessary, be used alone or in any desired mixture with one another.

Auxiliaries and/or additives that can be used here comprise substances known for this purpose, for example surfactant substances, foam stabilizers, cell regulators, fillers, pigments, dyes, antioxidants, hydrolysis stabilizers, antistatic agents, fungistatic agents and bacteriostatic agents.

Further details concerning the starting materials, blowing agents, catalysts, and also auxiliaries and/or additives used for the conduct of the process of the invention are found by way of example in Kunststoffhandbuch [Plastics handbook], vol. 7, "Polyurethane" [Polyurethanes] Carl-Hanser-Verlag, Munich, 1st ed., 1966, $2^{nd}$ ed., 1983 and 3rd ed., 1993.

The isocyanate-based rigid foams are produced by reacting the polyisocyanates and the compounds having at least two hydrogen atoms reactive towards isocyanate groups in quantities such that, in the case of the polyurethane foams, the isocyanate index is in the range from 80 to 500, in particular in the range from 90 to 400, more preferably in the range from 100 to 350, particularly preferably in the range from 105 to 300, with particular preference in the range from 110 to 200.

It has proven to be particularly advantageous to use the two-component process and to combine the compounds having at least two hydrogen atoms reactive toward isocyanate groups together with the blowing agents, foam stabilizers and flame retardants, and also the catalysts and auxiliaries and/or additives to give what is known as a polyol component, and to react this with the polyisocyanates or the mixtures of the polyisocyanates and optionally blowing agents, also termed isocyanate component.

Another aspect of the present invention also provides a rigid polyurethane foam or rigid polyisocyanurate foam obtainable or obtained by a process as described above. The present invention therefore also provides a rigid polyurethane foam or rigid polyisocyanurate foam obtainable or obtained by a process for the production of a rigid polyurethane foam or rigid polyisocyanurate foam comprising the reaction of a) at least one polyisocyanate and
b) a polyol composition (PZ), where the polyol composition (PZ) comprises at least one compound having at least two hydrogen atoms reactive toward isocyanate groups and at least one compound (I) selected from the group consisting of dicarboxylic diesters of dicarboxylic acids having from 2 to 18 C atoms and tricarboxylic triesters of tricarboxylic acids having from 3 to 18 C atoms.

The present invention further provides a polyol composition (PZ) at least comprising one compound having at least two hydrogen atoms reactive toward isocyanate groups and at least one compound (I) selected from the group consisting of dicarboxylic diesters of dicarboxylic acids having from 2 to 18 C atoms and tricarboxylic triesters of tricarboxylic acids having from 3 to 18 C atoms.

The present invention also provides the use, for the production of rigid polyurethane foams or rigid polisocyanurate foams, of a polyol composition (PZ) at least comprising one compound having at least two hydrogen atoms reactive toward isocyanate groups and at least one compound (I) selected from the group consisting of dicarboxylic diesters of dicarboxylic acids having from 2 to 18 C atoms and tricarboxylic triesters of tricarboxylic acids having from 3 to 18 C atoms.

The present invention further provides use of a rigid polyurethane foam or rigid polyisocyanurate foam as described above as, or for the production of, insulation materials, preferably insulation sheets, sandwich elements, hot-water tanks, boilers, coolers, insulation foams, refrigerators or freezers.

The present invention also provides an insulation sheet, sandwich element, hot-water tank, boiler, cooler, insulation foam, refrigerator or freezer which comprises, as insulation material, a rigid polyurethane foam or rigid polyisocyanurate foam as described above.

The process of the invention achieves good adhesion of the polyurethane foams or polyisocyanurate foams, in particular of those blown entirely or mainly by water. Good mechanical properties were moreover obtained for the foams, and the shelf life of the polyol component was improved.

Further embodiments of the present invention are found in the claims and in the examples. It will be self-evident that the abovementioned features, and the features explained hereinafter, of the product/process/uses of the invention can be used not only in the respective combinations stated but also in other combinations, without exceeding the scope of the invention. By way of example, the invention also implicitly comprises the combination of a preferred feature with a particularly preferred feature, or of a feature that is not further characterized with a particularly preferred feature, etc., even if said combination is not expressly mentioned.

Examples of embodiments of the present invention are listed below, but do not restrict the present invention. In particular, the present invention also comprises embodiments which result from the dependencies, and therefore combinations, stated below.

1. A process for the production of a rigid polyurethane foam or rigid polyisocyanurate foam, comprising the reaction of
   a) at least one polyisocyanate and
   b) a polyol composition (PZ),
   where the polyol composition (PZ) comprises at least one compound having at least two hydrogen atoms reactive toward isocyanate groups and at least one compound (I) selected from the group consisting of dicarboxylic diesters of dicarboxylic acids having from 2 to 18 C atoms and tricarboxylic triesters of tricarboxylic acids having from 3 to 18 C atoms, and
   where at least one blowing agent is used during the reaction.

2. The process according to embodiment 1, where the polyol composition (PZ) comprises the at least one blowing agent.

3. The process according to embodiment 1 or 2, where the compound (I) is selected from the group consisting of dicarboxylic diesters of the general formula:

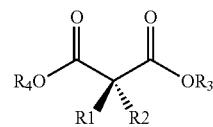

where R1 and R2 are mutually independently H or an alkyl moiety having from 1 to 6 C atoms; and
R3 and R4 are mutually independently an alkyl moiety having from 1 to 18 C atoms.

4. The process according to any of the embodiments 1 to 3, where the compound (I) is selected from the group consisting of malonic diesters.

5. The process according to any of the embodiments 1 to 4, where the compound (I) is selected from the group consisting of dimethyl malonate, diethyl malonate, dipropyl malonate, dibutyl malonate, dipentyl malonate, dihexyl malonate, methyl ethyl malonate, methyl propyl malonate, methyl butyl malonate, methyl pentyl malonate, methyl hexyl malonate, ethyl propyl malonate, ethyl butyl malonate, ethyl pentyl malonate, ethyl hexyl malonate, propyl butyl malonate, propyl pentyl malonate, propyl hexyl malonate, butyl pentyl malonate, butyl hexyl malonate and pentyl hexyl malonate.

6. The process according to any of the embodiments 1 to 5, where the quantity of the compound (I) used is in the range from 0.5 to 10% by weight, based on the weight of the polyol composition (PZ).

7. The process according to any of the embodiments 1 to 6, where the polyol composition (PZ) comprises at least one fatty acid or one fatty acid ester or a mixture thereof.

8. The process according to any of the embodiments 1 to 6, where the polyol composition (PZ) comprises castor oil.

9. The process according to any of the embodiments 1 to 8, where blowing agent used comprises a quantity of water in the range from 0.1 to 10% by weight, based on the weight of the polyol composition (PZ).
10. A rigid polyurethane foam or rigid polyisocyanurate foam obtainable or obtained by a process according to any of the embodiments 1 to 9.
11. A polyol composition (PZ) at least comprising one compound having at least two hydrogen atoms reactive toward isocyanate groups and at least one compound (I) selected from the group consisting of dicarboxylic diesters of dicarboxylic acids having from 2 to 18 C atoms and tricarboxylic triesters of tricarboxylic acids having from 3 to 18 C atoms.
12. The use, for the production of rigid polyurethane foams or rigid polyisocyanurate foams, of a polyol composition (PZ) at least comprising one compound having at least two hydrogen atoms reactive toward isocyanate groups and at least one compound (I) selected from the group consisting of dicarboxylic diesters of dicarboxylic acids having from 2 to 18 C atoms and tricarboxylic triesters of tricarboxylic acids having from 3 to 18 C atoms.
13. The use of a rigid polyurethane foam or rigid polyisocyanurate foam according to embodiment 10 as, or for the production of, insulation materials, preferably insulation sheets, sandwich elements, hot-water tanks, boilers, coolers, insulation foams, refrigerators or freezers.
14. An insulation sheet, sandwich element, hot-water tank, boiler, cooler, insulation foam, refrigerator or freezer which comprises, as insulation material, a rigid polyurethane foam or rigid polyisocyanurate foam according to embodiment 10.

The examples below serve to illustrate the invention, but are in no way restrictive in respect of the subject matter of the present invention.

EXAMPLES

1. Measurement Methods 1.1 Adhesion Measurements:

Unless otherwise stated, adhesion of the polyurethane foam to metal surfaces was measured by using a box mold measuring 200×200×80 mm$^3$ lined with aluminum-coated paper at a mold temperature of 35° C. The foam is applied to the aluminum-coated surface. After introduction of the reaction mixture, the mold is closed and, unless otherwise stated, the test sample is demolded after 7 min. A blade is then used to make incisions separated by 6 cm in the aluminum-coated side of the test sample facing toward the basal side of the mold. Unless otherwise stated, adhesion was determined 3 min after demolding, i.e. after a total of 10 min, with the aid of a tensile tester, the coated paper being peeled by way of a deflector roller at a tensile testing velocity of 100 mm/min perpendicularly to the plane of the molding, and the average force required for this purpose being measured.

1.2 Determination of the Phase-Stability of the Polyol Component:

The individual constituents of the polyol component were mixed thoroughly with the blowing agent, and then freed from incorporated air bubbles in an ultrasound bath, and stored in sealed test tubes at room temperature. The phase stability is the period for which the mixture can be stored at room temperature without any visually discernible clouding of, or phase-separation of, the component.

1.3 Determination of the Brittleness of the Rigid Foams:

Brittleness is determined qualitatively by use of the thumb to make an impression in the periphery of the foam. In brittle foams, even slight deformation is irreversible.

1.4 Determination of Compressive Strength:

Compressive strength is determined in accordance with DIN 53421/DIN EN ISO 604.

1.5 Determination of Dimensional Stability Autoclave):

1 day after production of a foam block, 18 samples uniformly distributed over the entire length of said block are taken. The approximate dimensions of the test samples are 5×5×4 cm$^3$. Precise volume is determined via immersion in a water bath. The samples are then dabbed dry and placed for 10 minutes in an autoclave at a gage pressure of 0.7 bar. The volume of each test sample is again determined, and the average value is calculated from all of the relative volume decreases.

1.6 Shelf Life Tests:

The polyol components are stored for 6 months at room temperature and/or 45° C. Foam samples were produced directly after blending of polyol component, and adhesion was determined at 35° C. or 30° C. mold temperature. After six months, foam samples were again produced and tested.

2. Starting Materials

Polyol 1: Polyether alcohol based on sorbitol and propylene oxide with OH number 490 mg KOH/g, viscosity 23 000 mPas at 25° C. and functionality 5.

Polyol 2: Polyether alcohol based on trimethylolpropane and propylene oxide with OH number 160 mg KOH/g, viscosity 300 mPas at 25° C. and functionality 3.

Polyol 3: Polyether alcohol based on glycerol, ethylene oxide and propylene oxide with OH number 160 mg KOH/g, viscosity 250 mPas at 25° C. and functionality 3.

Polyol 4: Polyether alcohol based on glycerol and propylene oxide with OH number 400 mg KOH/g, viscosity 400 mPas at 25° C. and functionality 3.

Polyol 5: Castor oil with OH number about 160 mg KOH/g, viscosity 1000 mPas at 20° C. and functionality 2.5.

Polyol 6: Polyester alcohol based on phthalic anhydride, oleic acid, diethylene glycol and monoethylene glycol with OH number 210 mg KOH/g, viscosity 2750 mPas at 25° C. and functionality 1.75.

Polyol 7: Polyester alcohol based on phthalic anhydride, oleic acid, diethylene glycol and on a polyether alcohol based on trimethylolpropane and ethylene oxide with OH number 610 mg KOH/g, viscosity 640 mPas at 25° C. and functionality 3.0. The OH number of the polyester alcohol is 250 mg KOH/g, its viscosity 1250 mPas at 25° C., and its functionality 2.22.

Polyol 8: Polyethylene glycol with an OH number of 188 mg KOH/g, viscosity 46 mPas at 50° C. and functionality 2.

Polyol 9: Polyester alcohol based on phthalic acid, diethylene glycol and monoethylene glycol with OH number 240 mg KOH/g, viscosity 7500 mPas at 25° C. and functionality 2.

Flame retardant: Tris(2-chloroisopropyl) phosphate with 9.5% phosphorus content and viscosity 71 mPas at 25° C.

Stabilizer 1: Tegostab B 8467® (Evonik)

Stabilizer 2: Niax Silicone® L 6900 (Momentive Performance Materials)

Amine catalyst 1: Dimethylcyclohexylamine

Amine catalyst 2: Lupragen® N 600 (BASF SE)

Blowing agent: formic acid, 85%

Catalyst 1: potassium formate, 40%/monoethylene glycol

Catalyst 2: bis(2-dimethylaminoethyl) ether, 20%/dipropylene glycol

Catalyst 3: N-methylbis-2-dimethylaminoethylamine, 26%/polyethylene glycol with OH number 250 mg KOH/g Isocyanate 1: Lupranat® M20 from BASF SE, polymeric MDI with 31.8% NCO content and viscosity 210 mPas at 25° C.

Isocyanate 2: Lupranat® M50 der BASF SE, polymeric MDI with 31.5% NCO content and viscosity 550 mPas at 25° C.

3. General Descriptions of Experiments 3.1 General Production Protocol (Manually Foamed Specimens)

The polyol components are thoroughly mixed with the stated quantity of isocyanate component by a laboratory stirrer (Vollrath stirrer) at a stirring rate of 1400 revolutions per minute and with a stirring time of 10 seconds, in a beaker, in which the mixture was also foamed. The variable determined in this "beaker test" are cream time, fiber time and full rise time, envelope density, and also when necessary brittleness.

3.2 General Description of Experiments (Machine Experiments)

A polyol component is produced from the stated raw materials. The polyol component is mixed with the respectively stated quantity of the stated isocyanate by means of a PU 30/80 IQ high-pressure Puromat (Elastogran GmbH) with an output rate of 250 g/s. The reaction mixture is introduced into temperature-controlled molds measuring 2000×200×55 mm³ (lance)

and allowed to foam therein. The mold is lined in advance with paper coated on one side with aluminum. The foam is applied to the aluminum-coated surface, and the mold is then closed.

Unless otherwise stated, the mold is controlled to a temperature of 45° C. and the foam is demolded after a defined time. Unless otherwise stated, overpacking is 14.5%. The coated paper is removed prior to all of the following measurements with the exception of measurement of adhesion.

(a) Determination of Cream Time and Fiber Time, and Also Free Core Envelope Density:

About 1000 g of the reaction mixture are injected in a PE bag (diameter about 30 cm). Cream time is defined as the period between start of injection and start of volume expansion of the reaction mixture. Fiber time is the period between start of injection and the juncture at which it becomes possible to draw fibers from the reaction mixture by using a foam strip. After hardening of the foam (24 h later), five samples measuring about 60×60×60 mm³ are cut from the center of the same sample in order to determine the free-foamed envelope density of the core. They are weighed, and their volume is determined via emersion in a water bath. The free envelope density of the core is calculated from these variables, and the average value is reported.

(b) Determination of Minimal Fill Density:

Minimal fill density is defined as the envelope density that is just sufficient to fill the lance mold. This is measured by producing, in the lance mold, a foam which fills from 90% to 95% of the mold and extrapolating to 100% fill. The quotient calculated from minimal fill density and free envelope density of the core is termed flow factor.

4. Examples 4.1 The polyol components listed in tables 1a and 1b were reacted with isocyanate 1 in accordance with the general production protocol under 3.1 (isocyanate index 118).

Table 2a collates the properties of the resultant rigid foams. The demolding time for determination of adhesion was 7 minutes. Adhesion was measured after a further 3 minutes, i.e. after a total of 10 minutes.

TABLE 1a

Composition of polyol component

| Compound | 1 (C) | 2 | 3 | 4 | 5 | 6 |
|---|---|---|---|---|---|---|
| Polyol 1 | 36.900 | 36.900 | 36.900 | 36.900 | 36.900 | 36.900 |
| Polyol 2 | 36.050 | 36.050 | 36.050 | 36.050 | 36.050 | 36.050 |
| Polyol 4 | 3.000 | 3.000 | 3.000 | 3.000 | 3.000 | 3.000 |
| N,N-Dimethylbenzylamine | 2.500 | 2.500 | 2.500 | 2.500 | 2.500 | 2.500 |
| Propylene carbonate | 2.000 | 2.000 | | | | |
| Stabilizer 2 | 2.000 | 2.000 | 2.000 | 2.000 | 2.000 | 2.000 |
| Polyol 5 | 12.000 | 12.000 | 12.000 | 12.000 | 12.000 | 12.000 |
| Amine cat 2 | 0.400 | 0.400 | 0.400 | 0.400 | 0.400 | 0.400 |
| Amine cat 1 | 0.800 | 0.800 | 0.800 | 0.800 | 0.800 | 0.800 |
| Water | 4.350 | 4.350 | 4.350 | 4.350 | 4.350 | 4.350 |
| Ethyl acetoacetate | | 2.000 | | | | |
| Diethyl malonate | | | 2.000 | | | |
| Isopropyl myristate | | | | 2.000 | | |
| Methyl acetoacetate | | | | | 2.000 | |
| Ethyl cinnamate | | | | | | 2.000 |

TABLE 1b

Composition of polyol component

| Compound | 7 | 8 | 9 | 10 | 11 |
|---|---|---|---|---|---|
| Polyol 1 | 36.900 | 36.900 | 36.900 | 36.900 | 36.900 |
| Polyol 2 | 36.050 | 36.050 | 36.050 | 36.050 | 36.050 |
| Polyol 4 | 3.000 | 3.000 | 3.000 | 3.000 | 3.000 |
| N,N-Dimethylbenzylamine | 2.500 | 2.500 | 2.500 | 2.500 | 2.500 |
| Propylene carbonate | | | | | |
| Stabilizer 2 | 2.000 | 2.000 | 2.000 | 2.000 | 2.000 |
| Polyol 5 | 12.000 | 12.000 | 12.000 | 12.000 | 12.000 |
| Amine cat 2 | 0.400 | 0.400 | 0.400 | 0.400 | 0.400 |
| Amine cat 1 | 0.800 | 0.800 | 0.800 | 0.800 | 0.800 |
| Water | 4.350 | 4.350 | 4.350 | 4.350 | 4.350 |
| Diethylene glycol | 2.000 | | | | |
| Monoethylene glycol | | 2.000 | | | |
| Oleic acid | | | 2.000 | | |
| Decanol | | | | 2.000 | |
| Octanol | | | | | 2.000 |

TABLE 2a

| Example | Adhesion, 35° C. [N] | Homogeneity after 90 days |
|---|---|---|
| 1 | 9.58 | satisfactory |
| 2 | 10.22 | satisfactory |

TABLE 2a-continued

| Example | Adhesion, 35° C. [N] | Homogeneity after 90 days |
|---|---|---|
| 3 | 7.73 | satisfactory |
| 4 | 6.86 | satisfactory |
| 5 | 6.43 | satisfactory |
| 6 | 7.94 | satisfactory |
| 7 | 10.10 | satisfactory |
| 8 | 4.48 | satisfactory |
| 9 | 6.55 | satisfactory |
| 10 | 3.39 | satisfactory |
| 11 | 5.13 | satisfactory |

Shelf life was tested for examples 1, 2, 3, 6 and 7. Table 2b collates the results. Demolding time for determination of adhesion was 7 minutes in every case. Adhesion was measured after a further 3 minutes, i.e. after a total of 10 minutes.

TABLE 2b

| | Example | | | | |
|---|---|---|---|---|---|
| | 1 (C) | 2 | 3 | 6 | 7 |
| Adhesion, 35° C., [N] | 9.6 | 10.2 | 7.7 | 7.9 | 10.1 |
| Adhesion, 30° C., [N] | 6.6 | 0.5 | | | 0.5 |
| Adhesion, 25° C., [N] | 0.9 | | | | |
| Adhesion, 35° C., after storage for 6 months at RT [N] | 9.8 | 10.9 | 11.3 | 11.8 | 1.7 |
| Adhesion, 35° C., after storage for 6 months at 45° C. [N] | 5.4 | 1.7 | 11.3 | 10.3 | 2.1 |
| Adhesion, 30° C., after storage for 6 months at RT [N] | 2.2 | 1.1 | 3.7 | | |
| Adhesion, 30° C., after storage for 6 months at 45° C. [N] | 1.3 | | 1.9 | 2.6 | 0.9 |
| Adhesion, 25° C., after storage for 6 months at RT [N] | | | 1.0 | | |
| Adhesion, 25° C., after storage for 6 months at 45° C. [N] | | | | 1.5 | |

4.2 In the machine experiment, the polyol components listed in table 3 were reacted with isocyanate 1 in accordance with the general experimental description (isocyanate index 118, overpacking 14.5%).

Table 4 collates the properties of the resultant rigid foams. Demolding time for determination of adhesion was 7 minutes in every case. Adhesion was measured after a further 3 minutes, i.e. after a total of 10 minutes.

TABLE 3

Composition of polyol component

| | Example | | |
|---|---|---|---|
| Compound | 12 (C) | 13 | 14 |
| Polyol 1 | 36.900 | 36.900 | 36.900 |
| Polyol 2 | 36.050 | 36.050 | 36.050 |
| Polyol 4 | 3.000 | 3.000 | 3.000 |
| N,N-Dimethylbenzylamine | 2.500 | 2.500 | 2.500 |
| Propylene carbonate | 2.000 | | |
| Stabilizer 2 | 2.000 | 2.000 | 2.000 |
| Polyol 5 | 12.000 | 12.000 | 12.000 |
| Amine cat 2 | 0.400 | 0.400 | 0.400 |
| Amine cat 1 | 0.800 | 0.800 | 0.800 |
| Water | 4.350 | 4.350 | 4.350 |
| Diethyl malonate | | 2.000 | |
| Ethyl cinnamate | | | 2.000 |

TABLE 4

Machine experiment

| | Example | | |
|---|---|---|---|
| | 12 (C) | 13 | 14 |
| Cream time [s] | 8 | 8 | 8 |
| Gel time [s] | 45 | 49 | 44 |
| Free-foamed envelope density [g/l] | 24.9 | 24.4 | 24.0 |
| Overall envelope density [g/l] | 33.9 | 32.5 | 32.3 |
| Flow factor | 1.36 | 1.33 | 1.35 |
| Adhesion [N] | | | |
| 30° C. | 1.85 | 1.12 | 1.18 |
| 35° C. | 7.87 | 6.27 | 6.07 |
| 40° C. | 10.74 | 8.45 | 7.69 |
| 45° C. | 12.18 | 10.63 | 8.30 |
| Compressive strength [N/mm$^2$] | 0.183 | 0.177 | 0.153 |
| Dimensional stability [vol %] | −1.01 | −0.58 | −1.50 |

4.3 In the machine experiment, the polyol components listed in table 5 were reacted with isocyanate 1 (isocyanate index 114, overpacking 14.5%).

Table 6 collates the properties of the resultant rigid foams.

TABLE 5

Composition of polyol component

| Compound | Example 15 |
|---|---|
| Polyol 1 | 36.200 |
| Polyol 3 | 35.850 |
| Polyol 4 | 3.000 |
| N,N-Dimethylbenzylamine | 1.500 |
| Stabilizer 2 | 3.000 |
| Polyol 5 | 12.000 |
| Amine cat 2 | 0.250 |
| Amine cat 1 | 0.400 |
| Water | 4.800 |
| Diethyl malonate | 3.000 |

TABLE 6

Machine experiment

| | Example 15 |
|---|---|
| Cream time [s] | 16 |
| Gel time [s] | 80 |
| Free-foamed envelope density [g/l] | 25.4 |
| Overall envelope density [g/l] | 39.04 |
| Compressive strength [N/mm$^2$] | 0.168 |
| Dimensional stability [vol %] | −0.73 |

4.4 In accordance with the general production protocol under 3.1, the polyol components listed in table 7 were reacted with isocyanate 2.

Table 8 collates the properties of the resultant rigid foams. Demolding time for determination of adhesion was 21 minutes in every case. Adhesion was measured after a further 3 minutes, i.e. after a total of 24 minutes.

TABLE 7

Composition of polyol component

| | Example | | | |
|---|---|---|---|---|
| Compound | 16 (C) | 17 | 18 (C) | 19 |
| Polyol 6 | 48.400 | 48.400 | | |
| Flame retardant | 25.000 | 25.000 | 12.000 | 12.000 |

TABLE 7-continued

Composition of polyol component

| | Example | | | |
|---|---|---|---|---|
| Compound | 16 (C) | 17 | 18 (C) | 19 |
| Polyol 7 | 15.000 | 15.000 | | |
| Polyol 8 | 8.000 | 8.000 | 8.000 | 8.000 |
| Stabilizer 1 | 2.000 | 2.000 | 2.000 | 2.000 |
| Formic acid, 85% | 1.600 | 1.600 | 1.200 | 1.200 |
| Diethyl malonate | | 1.000 | | 3.000 |
| Polyol 9 | | | 76.400 | 76.400 |
| Catalyst 1 | 1.400 | 1.400 | 1.200 | 1.200 |
| Catalyst 2 | 2.400 | 2.400 | | |
| Catalyst 3 | | | 3.300 | 3.300 |
| 80/20 mixture of n-pentane and isopentane | 8.000 | 8.000 | 13.500 | 13.500 |
| Index | 289 | 292 | 333 | 341 |

TABLE 8

| | Example | | | |
|---|---|---|---|---|
| | 16 (C) | 17 | 18 (C) | 19 |
| Cream time [s] | 14 | 14 | 12 | 13 |
| Fiber time [s] | 51 | 59 | 48 | 58 |
| Full rise time [s] | 76 | 78 | 78 | 80 |
| Adhesion, 35° C., 21/24 min | 2.22 | 2.73 | 6.21 | 13.32 |

4.5 In accordance with the general production protocol under 3.1, the polyol components listed in table 9 were reacted with isocyanate 1.

Table 10 collates the properties of the resultant rigid foams. Demolding time for determination of adhesion was 7 minutes. Adhesion was measured after a further 3 minutes, i.e. after a total of 10 minutes.

TABLE 9

Composition of polyol component

| | Example | | | | | | | |
|---|---|---|---|---|---|---|---|---|
| Compound | 20 | 21 | 22 | 23 | 24 | 25 | 26 | 27 |
| Polyol 1 | 35.800 | 35.800 | 35.800 | 35.800 | 35.800 | 35.800 | 35.800 | 35.800 |
| Polyol 3 | 35.500 | 38.500 | 37.500 | 33.500 | 30.500 | 35.500 | 35.500 | 35.500 |
| Polyol 4 | 3.000 | 3.000 | 3.000 | 3.000 | 3.000 | 3.000 | 3.000 | 3.000 |
| N,N-Dimethyl-benzylamine | 1.500 | 1.500 | 1.500 | 1.500 | 1.500 | 1.500 | 1.500 | 1.500 |
| Stabilizer 2 | 3.000 | 3.000 | 3.000 | 3.000 | 3.000 | 3.000 | 3.000 | 3.000 |
| Polyol 5 | 12.000 | 12.000 | 12.000 | 12.000 | 12.000 | 12.000 | 12.000 | 12.000 |
| Amine cat 2 | 0.500 | 0.500 | 0.500 | 0.500 | 0.500 | 0.500 | 0.500 | 0.500 |
| Amine cat 1 | 0.900 | 0.900 | 0.900 | 0.900 | 0.900 | 0.900 | 0.900 | 0.900 |
| Water | 4.800 | 4.800 | 4.800 | 4.800 | 4.800 | 4.800 | 4.800 | 4.800 |
| Diethyl malonate | 3.000 | | 1.000 | 5.000 | 8.000 | | | |
| Malonic acid | | | | | | 3.000 | | |
| Acetylacetone | | | | | | | 3.000 | |
| Fe(III) acetylacetonate | | | | | | | | 3.000 |
| Index | 115 | 114 | 114 | 115 | 116 | 115 | 115 | 114 |

TABLE 10

| | Example | | | | | | | |
|---|---|---|---|---|---|---|---|---|
| | 20 | 21 | 22 | 23 | 24 | 25 | 26 | 27 |
| Cream time [s] | 15 | 15 | 15 | 15 | 14 | 21 | 16 | 14 |
| Fiber time [s] | 63 | 62 | 61 | 63 | 64 | 120 | 73 | 43 |
| Full rise time [s] | 98 | 95 | 96 | 98 | 103 | 170 | 108 | 64 |
| Envelope density [g/l] | 28.4 | 28.3 | 28.4 | 27.9 | 28.0 | 27.1 | 28.2 | 28.5 |
| Adhesion [N], 35° C., 7/10 min | 9.26 | 5.76 | 5.52 | 9.42 | 9.62 | | 0.51 | 1.39 |
| Phase-stability of polyol component (homogeneity) | homogeneous | homogeneous | homogeneous | homogeneous | homogeneous | precipitate | homogeneous | precipitate |

5. Shrinkage Behavior (Dimensional Stability at Room Temperature (20° C.) Over a Defined Time)

The shrinkage test for a foam consists in a purely visual assessment. The foamed samples are compared with a comparative system (sample S-1, corresponding to the original). All of the samples, including the comparative sample S-1, are produced on the same day in order to ensure comparability. The samples are examined visually every 2-3 days over a period of 4 weeks. Shrinkage of the sample is recorded as more than, less than, or the same as that of the original, or no shrinkage at all.

TABLE 11

Tests relating to shrinkage behavior

| Example | | S-1 | S-2 | S-3 | S-4 | S-5 | S-6 | S-7 | S-8 | S-9 |
|---|---|---|---|---|---|---|---|---|---|---|
| Polyol 1 | | | | | | 36.20 | | | | |
| Polyol 3 | | | | | | 35.85 | | | | |
| Polyol 4 | | | | | | 3.000 | | | | |
| N,N-Dimethyl-benzylamine | | | | | | 1.500 | | | | |
| Stabilizer 2 | | | | | | 3.000 | | | | |
| Polyol 5 | | | | | | 12.00 | | | | |
| Amine cat 2 | | | | | | 0.250 | | | | |
| Amine cat 1 | | | | | | 0.400 | | | | |
| Water | | | | | | 4.800 | | | | |
| Diethyl malonate | % | 3.0 | | | | | | | | |
| Dimethyl adipate | % | | 3.0 | | | 1.0 | 0.6 | 0.7 | | 0.6 |
| Dimethyl glutarate | % | | | 3.0 | | 1.0 | 1.8 | 2.3 | 2.0 | 2.0 |
| Dimethyl succinate | % | | | | 3.0 | 1.0 | 0.6 | | 1.0 | 0.4 |
| Cream time | s | 27 | 28 | 29 | 28 | 28 | 27 | 26 | 28 | 30 |
| Fiber time | s | 148 | 141 | 143 | 140 | 140 | 137 | 137 | 142 | 145 |
| Envelope density | g/l | 31.2 | 31.2 | 31.3 | 30.7 | 30.5 | 30.4 | 30.3 | 30.9 | 30.9 |
| Adhesion, 30° C., 7/10 min | N | 0.60 | 1.49 | 0.47 | 0.80 | 0.48 | 0.45 | 0.48 | 0.47 | 0.50 |
| Shrinkage in comparison with original | | = | > | = | > | > | > | = | | |
| Phase-stability of polyol component | | homogeneous | homogeneous | homogeneous | homogeneous | homogeneous | homogeneous | homogeneous | homogeneous | homogeneous |

The invention claimed is:

1. A process for producing a rigid polyurethane foam or a rigid polyisocyanurate foam, the process comprising reacting a mixture consisting essentially of a) at least one polyisocyanate;
   b) a polyol composition (PZ) comprising at least one compound having at least two hydrogen atoms reactive toward isocyanate groups and at least one dicarboxylic diester of formula (I):

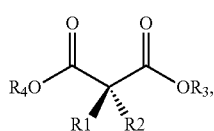

(I)

wherein:
   R1 and R2 are each independently H or an alkyl moiety having from 1 to 6 C atoms; and
   $R_3$ and $R_4$ are each independently an alkyl moiety having from 1 to 18 C atoms;
   and wherein at least one of said at least one compound having at least two hydrogen atoms reactive towards isocyanate groups is a polyether alcohol (P1) with a hydroxyl number in the range of 350 to 600 mgKOH/g and with a functionality in the range of 3.5 to 5.5, in an amount in the range of from 35 to 55% by weight based on the weight of component b),
   c) a foam stabilizer; and
   d) at least one blowing agent,
   forming a rigid polyurethane foam or a rigid polyisocyanurate foam,
   wherein the at least one blowing agent is water or water in a mixture with at least one other blowing agent selected from the group consisting of propane, n-butane, iso-butane, cyclobutane, n-pentane, iso-pentane, cyclopentane, cyclohexane, dimethyl ether, methyl ethyl ether, methyl butyl ether, methyl formate, acetone, 1,3,3,3-tetrafluoropropene, 1,1,1,2,3-pentafluoropropene, 1,1,1,4,4,4-hexafluorobutene, and 1-chloro-3,3,3-trifluoropropene,
   insofar as water is used as the sole at least one blowing agent, a content of the water is from 1 to 10% by weight, based on a total weight of the polyol composition (PZ), and insofar as water is used in the mixture with the at least one other blowing agent selected from the group consisting of propane, n-butane, iso-butane, cyclobutane, n-pentane, iso-pentane, cyclopentane, cyclohexane, dimethyl ether, methyl ethyl ether, methyl butyl ether, methyl formate, acetone, 1,3,3,3-tetrafluoropropene, 1,1,1,2,3-pentafluoropropene, 1,1,1,4,4,4-hexafluorobutene, and 1-chloro-3,3,3-trifluoropropene, the content of the water is from 0.1 to 5% by weight, based on the total weight of the polyol composition (PZ),
   a quantity of the at least one dicarboxylic diester of formula (I) used is in the range from 0.5 to 5.0% by weight, based on the weight of the polyol composition (PZ), and
   said reacting is conducted in the absence of a fluoroalkane blowing agent.

2. The process according to claim 1, wherein the polyol composition (PZ) comprises the at least one blowing agent.

3. The process according to claim 1, wherein the at least one dicarboxylic diester of formula (I) is selected from the group consisting of malonic diesters.

4. The process according to claim 1, wherein the at least one dicarboxylic diester of formula (I) is selected from the group consisting of dimethyl malonate, diethyl malonate, dipropyl malonate, dibutyl malonate, dipentyl malonate, dihexyl malonate, methyl ethyl malonate, methyl propyl malonate, methyl butyl malonate, methyl pentyl malonate, methyl hexyl malonate, ethyl propyl malonate, ethyl butyl malonate, ethyl pentyl malonate, ethyl hexyl malonate, propyl butyl malonate, propyl pentyl malonate, propyl hexyl malonate, butyl pentyl malonate, butyl hexyl malonate, and pentyl hexyl malonate.

5. The process according to claim 1, wherein the polyol composition (PZ) further comprises at least one fatty acid or one fatty acid ester or a mixture thereof.

6. The process according to claim 1, wherein the polyol composition (PZ) further comprises castor oil.

7. The process according to claim 1, wherein the at least one blowing agent is water and the content of water is from 2.5 to 7.5% by weight, based on the total weight of the polyol composition (PZ).

8. A rigid polyurethane foam or a rigid polyisocyanurate foam, obtained by the process according to claim 1.

9. An insulation sheet, a sandwich element, a hot-water tank, a boiler, a cooler, an insulation foam, a refrigerator, or a freezer comprising, as an insulation material, the rigid polyurethane foam or the rigid polyisocyanurate foam according to claim 8.

10. The process according to claim 1, wherein the at least one blowing agent is water in the mixture with the at least one other blowing agent selected from the group consisting of propane, n-butane, iso-butane, cyclobutane, n-pentane, iso-pentane, cyclopentane, cyclohexane, dimethyl ether, methyl ethyl ether, methyl butyl ether, methyl formate, acetone, 1,3,3,3-tetrafluoropropene, 1,1,1,2,3-pentafluoropropene, 1,1,1,4,4,4-hexafluorobutene, and 1-chloro-3,3,3-trifluoropropene, and wherein the content of water is from 0.3 to 4% by weight, based on the total weight of the polyol composition (PZ).

11. The process according to claim 1, wherein the quantity of the at least one dicarboxylic diester of formula (I) used is in the range from 1.0 to 5.0% by weight, based on the weight of the polyol composition (PZ).

12. The process according to claim 1, wherein the quantity of the at least one dicarboxylic diester of formula (I) used is in the range from 1.5 to 5.0% by weight, based on the weight of the polyol composition (PZ).

13. The process according to claim 1, wherein R3 and R4 are each independently an alkyl moiety having 1 to 2 C atoms and said at least one polyisocyanate and said at least one compound having at least two hydrogen atoms reactive toward isocyanate groups are reacted at an isocyanate index of 110 to 500.

14. The process according to claim 1, wherein said at least one polyisocyanate and said at least one compound having at least two hydrogen atoms reactive toward isocyanate groups are reacted at an isocyanate index of 100 to 500.

15. The process according to claim 1, wherein said at least one polyisocyanate and said at least one compound having at least two hydrogen atoms reactive toward isocyanate groups are reacted at an isocyanate index of 105 to 500.

16. The process according to claim 1, wherein said at least one polyisocyanate and said at least one compound having at least two hydrogen atoms reactive toward isocyanate groups are reacted at an isocyanate index of 110 to 500.

17. The process according to claim 1, wherein said rigid polyurethane foam or rigid polyisocyanate foam is formed as a component of a structure selected from the group consisting of a sandwich element, a hot-water tank, a boiler, a cooler, a refrigerator and a freezer.

\* \* \* \* \*